(12) United States Patent
Coart et al.

(10) Patent No.: US 8,931,133 B2
(45) Date of Patent: Jan. 13, 2015

(54) CONNECTING DEVICE

(75) Inventors: Kris Coart, Landen (BE); Peter Saevels, Attenrode (BE); Mohamed Aznag, Scherpenheuvel-Zichem (BE); Eric Windmolders, Kermt (BE); Robert Vertongen, Heusden-Zolder (BE); Jan Bonroy, Heverlee (BE)

(73) Assignee: Robert Bosch GmbH, Stuttgart (DE)

( * ) Notice: Subject to any disclaimer, the term of this patent is extended or adjusted under 35 U.S.C. 154(b) by 345 days.

(21) Appl. No.: 13/496,199

(22) PCT Filed: Jul. 23, 2010

(86) PCT No.: PCT/EP2010/060699
§ 371 (c)(1),
(2), (4) Date: May 29, 2012

(87) PCT Pub. No.: WO2011/032761
PCT Pub. Date: Mar. 24, 2011

(65) Prior Publication Data
US 2012/0233801 A1 Sep. 20, 2012

(30) Foreign Application Priority Data

Sep. 15, 2009 (DE) .......................... 10 2009 029 458

(51) Int. Cl.
*B60S 1/40* (2006.01)
*B60S 1/38* (2006.01)

(52) U.S. Cl.
CPC ............. *B60S 1/3868* (2013.01); *B60S 1/4038* (2013.01); *B60S 1/3856* (2013.01); *B60S 2001/3898* (2013.01); *B60S 2001/4051* (2013.01); *B60S 2001/4054* (2013.01)
USPC .............. 15/250.44; 15/250.001; 15/250.351; 15/250.43; 15/250.46

(58) Field of Classification Search
CPC ..... B60S 1/3868; B60S 1/4038; B60S 1/3856
USPC ........... 15/250.001, 250.351, 250.44, 250.43, 15/250.32, 250.46; 29/525.01
See application file for complete search history.

(56) References Cited

U.S. PATENT DOCUMENTS

| 3,431,579 A | 3/1969 | Krohm et al. | |
| 7,979,950 B2 | 7/2011 | Boland | |
| 2004/0211021 A1* | 10/2004 | Weber et al. | ............... 15/250.32 |

FOREIGN PATENT DOCUMENTS

| CN | 101312861 | 11/2008 |
| DE | 10347637 | 5/2005 |

(Continued)

OTHER PUBLICATIONS

PCT/EP2010/060699 International Search Report dated Sep. 14, 2010 (4 pages).

*Primary Examiner* — Monica Carter
*Assistant Examiner* — Michael Jennings
(74) *Attorney, Agent, or Firm* — Michael Best & Friedrich LLP (57) ABSTRACT

The invention relates to a connecting device which has a connecting element (18) of flat beam design fixed to a wiper blade (10) and an adapter (16) joined to said connecting element in an articulated manner, and also a joining element (14) that is joined to a wiper arm (12) and into the u-shaped cross-sectional profile of which the adapter (16) is inserted and, by means of a spring tongue (64) arranged on the top wall (42) thereof, is fixed to a pushbutton (66), the connecting element (18) having a central web (28) running in the longitudinal direction of the wiper blade (10) and bearing a hinge shaft (30) projecting on the long sides thereof, which is mounted in laterally flexible hubs (46) in side walls (40) of the adapter (16). According to the invention, the outwardly facing walls of the adapter (16), namely the side walls (40), the top wall (42), and the end walls (36, 62), have a general wall thickness of at least two millimeters, and the hubs (46) are to be formed as blind holes, the cylindrical surfaces of which form radial sliding surfaces (48) and the end faces of which form axial sliding surfaces (50), which are highly polished with an arithmetic mean roughness of Ra<0.2μ, and that the sliding surfaces (48, 50) be the sole contact surfaces between the connecting element (18) and the adapter (16).

11 Claims, 5 Drawing Sheets

(56) References Cited

FOREIGN PATENT DOCUMENTS

| | | | |
|---|---|---|---|
| EP | 1484224 | 12/2004 | |
| SU | 1369667 | 1/1988 | |
| WO | WO 2005039944 A1 * | 5/2005 | ................ B60S 1/40 |
| WO | WO 2006106006 A1 * | 10/2006 | ................ B60S 1/40 |

* cited by examiner

CONNECTING DEVICE

BACKGROUND OF THE INVENTION

The invention relates to a connecting device for connecting a wiper blade to a wiper arm.

A connecting device of the generic kind is known from the German patent publication DE 103 47 637 A1. A wiper blade of flat beam design is connected via said connecting device to a wiper arm in an articulated manner. The wiper blade comprises a wiper strip, in the longitudinal grooves of which two spring rails are laterally inserted, which serve as a support element and to which a connecting element in the form of a sheet metal claw is fastened. The connecting element comprises a central web which extends in the longitudinal direction of the wiper blade and which bears a hinge shaft that runs transversally thereto. Hubs of an adapter are mounted on the hinge shaft on both sides of the central web, wherein said hubs are arranged in spring tongues. Said hubs form laterally flexible parts of the side walls of the adapter. The spring tongues are separated from the side walls by gaps except for one side which faces away from the wiper strip.

Besides the side walls, which are connected to one another by means of a top wall, the adapter comprises a front end wall, which has a projection in the direction of the side walls and the top wall. Said projection provides contact surfaces for an end edge of a joining element which is integrally formed on a wiper arm. A connecting profile for a spoiler part is furthermore provided in the front end wall, said spoiler part being fastened to the spring rails and covering the wiper blade on the side facing away from the wiper lip. A spoiler part is disposed in each case on both sides of the connecting element in the longitudinal direction.

In order to stiffen the side walls of the adapter, numerous transverse walls and stiffening ribs are provided between said side walls. In addition, these serve to laterally guide the adapter along the longitudinal web of the connecting element.

During assembly, the joining element is pushed over the adapter transversely with respect to the longitudinal direction of said adapter and in the direction of the wiper strip until the guide rails engage with detent lugs in spring tongues along the lower longitudinal edges of the side walls of said joining element. In the assembled state, the end sides of the guide rails facing towards the free end of the wiper blade rest against guide rails of the adapter, which catch below the side walls of said joining element. Furthermore, the end edge of said joining element rests against the projection of the front end wall of the adapter, which has an undercut in the region of the adjacent guide rail, which fits to the front end edge of said joining element.

The adapter comprises in the top wall thereof a spring tongue having a push button facing outwards. The spring tongue extends in the longitudinal direction of the wiper blade and is connected to the top wall at the side facing the front end wall. Apart from this, said spring tongue is furthermore separated from said top wall by a gap. In the fitted state the push button latches into a matching opening in the joining element and thereby secures the fitted position of the adapter in the longitudinal direction with respect to the joining element.

The wiper blade can also be mounted to the wiper arm in the longitudinal direction by the joining element being pushed from the rear end wall of the adapter over the same until the push button latches into the matching opening in said joining element. In so doing, the guide rails of said joining element latch under the detent hooks on the lateral spring tongues of the adapter.

A similar connecting device is known from the German patent publication DE 60 2004 010 644, in which the spring tongue is fastened to the top wall of the adapter on the side thereof facing the rear wall. The rear wall itself is reduced to a transverse web so that the connecting cross sections are very small with respect to the side walls.

SUMMARY OF THE INVENTION

According to the invention, the outwardly facing walls of the adapter, namely the side walls, the top wall and the end walls have a general wall thickness of at least two millimeters. In addition, the hubs are formed as blind holes, the cylindrical surfaces of which form radial sliding surfaces and the end faces of which form axial sliding surfaces, which are highly polished with an arithmetic mean roughness of $Ra<0.2\mu$. The sliding surfaces are furthermore the sole contact surfaces between the connecting element and the adapter. In this regard, the sliding surfaces on the end faces of the hinge shaft and on the bottom of the blind holes act as axial bearings, whereas the radial sliding surfaces on the cylindrical surfaces of the hubs and on the periphery of said hinge shaft serves as radial bearings. Low bearing friction and a precise guidance between said hinge shaft and the hubs are achieved by the special surface quality in the bearing area. Because the contact between the adapter and the connecting element is limited to the aforementioned sliding surfaces, no further frictional losses occur in the connecting device according to the invention. The inherently reduced stiffness of the adapter due to the omission of transverse walls is compensated by the greater wall thickness of the outwardly facing walls. This further has the advantage that the connection of the hubs is relatively rigid when the flexibility of the side walls is sufficient in the region of said hubs so that a loss in the support or lateral guidance in the event of impact or a blockage of the windshield wiper is not of concern. Finally lateral spring tongues are eliminated, which can easily break if installation is not performed with care.

In order to generously dimension the hubs, it is useful for said hubs to be disposed in hub sockets, which protrude inwardly on the insides of the side walls. At the same time, recesses can be provided on the outside of said side walls. The desired flexibility in the region of the hubs can be modified by means of said recesses, e.g., also by means of stiffening ribs which are disposed in said recesses and are approximately flush with the outside of the side wall adjoining the recess. In order not to impair the flexibility of the side walls in the region of the stiffening ribs of the adapter, if the adapter is mounted in the joining element, said joining element comprises undercuts in the region of the stiffening ribs; thus enabling said stiffening ribs to laterally deflect without bracing themselves against the side walls of said joining element.

In order to obtain a guidance of the wiper blade which transversely with respect to the longitudinal direction is as free of play as possible, it is useful for the length of the hinge shaft to slightly exceed the distance at which the axial sliding surfaces of the hubs are spaced from one another; thus enabling said axial gliding surfaces to rest with a preload against the end faces of said hinge shaft in the assembled state.

According to a further embodiment of the invention, the adapter comprises contact surfaces in the longitudinal direction on both sides of the recesses on the outsides of the side walls, said contact surfaces resting closely against the insides of said side walls of the joining element. This measure has the advantage that a transverse motion of the adapter in the joining element is avoided. Furthermore in connection with the precise mounting and guidance of the wiper blade provided by the high-quality bearing support of the hinge shaft, the possible torsional movement around the longitudinal axis is limited.

According to a further embodiment of the invention, the spring tongue is connected to the rear end wall and forms a gap with the top wall of the adapter, wherein the pushbutton on the side of said spring tongue which faces away from the rear end wall protrudes outwardly over the spring tongue and in the assembled state latches into an opening in the top wall of the joining element. In so doing, the spring tongue can be subjected to pressure in the mounting direction, which is more advantageous with regard to stability and an accidental disconnection. In addition, the critical connection cross section between said spring tongue and the side walls can be significantly improved if the rear end wall of the adapter extends from the top wall to the lower edge of said side walls. The closed rear end wall furthermore prevents the adapters from getting caught in one another during transport. It is furthermore advantageous for the spring tongue to have at least one projection on the end thereof facing away from the rear end wall, said projection resting against the inside of the top wall of the joining element in the assembled state. The adapter can therefore be used for joining elements having different openings without running the risk that the pushbutton outwardly protrudes with the spring element through the opening of said joining element.

According to a further embodiment of the invention, retaining blocks are provided in recesses on the end of the side walls facing the rear end wall, said retaining blocks together with the recesses forming mounting channels for guide rails on the lower edges of the side walls of the joining element, wherein the mounting channels enlarge towards the rear end wall. Said mounting channels facilitate an easy insertion of the guide rails. In addition, the retaining blocks are dimensioned so strongly that they cannot be damaged during mounting or during operation.

In order to make mounting of the connector of a connecting device according to the invention easier, the adapter has an assembly opening, into which a gripper of a mounting tool of a mounting device is inserted in the mounting direction and is expanded in the opening direction so that the adapter being held in this manner can be pushed over the hinge shaft, whereupon said hinge shaft interlocks with the hubs.

A wiper blade, a wiper arm and an adapter should further have a protective covering insofar as they are provided and suited for use with a connecting device according to the invention.

BRIEF DESCRIPTION OF THE DRAWINGS

Further advantages ensue from the following description of the drawings. Exemplary embodiments of the invention are depicted in the drawings. The drawings, the description and the claims contain numerous features in combination. The specialist in the field will also consider said features individually and put them together in further useful combinations.

The following are shown.

DETAILED DESCRIPTION

Figure 1:
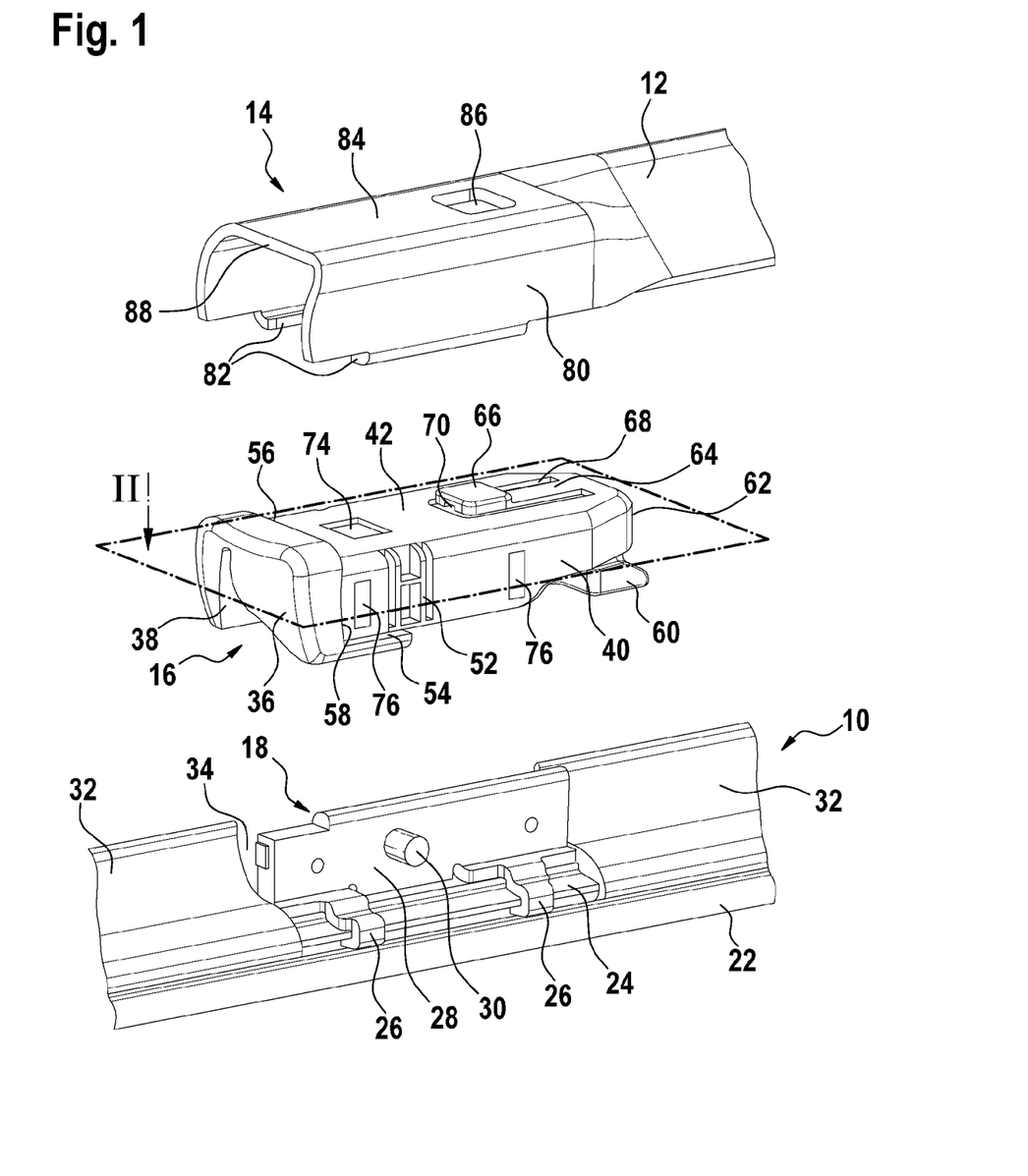
FIG. 1 a connecting device according to the invention in a perspective exploded view, FIG. 2 a perspective cross section of an adapter having a connecting element according to plane II in FIG. 1, FIG. 3 a perspective partial view of the adapter from below, FIG. 4 a cross section through the connecting device according to the invention, FIG. 5 a longitudinal section corresponding to line V-V in FIG. 4, FIG. 6 a perspective view of the adapter from above, FIG. 7 a perspective partial view of the adapter from the side and FIG. 8 a schematic cross section through a mounting device with the adapter and the connecting element.

A wiper blade 10 of flat beam design comprises a wiper strip 20 having a wiper lip 22 and two spring rails serving as a support element 24, which are inserted in longitudinal grooves of the wiper strip 20. A connecting element 18 in the form of a sheet metal claw is fastened by means of claws 26 to the central section of parts of the supporting element 24 laterally protruding from said wiper strip 20. The claws 26 encompass the support element 26 along the outer longitudinal sides and are connected on their other end by a central web 28. Said web runs in the longitudinal direction of the wiper blade 10 and bears a hinge shaft 30 projecting on both sides thereof. Spoiler parts 32 are attached in the longitudinal direction to both sides of the connecting element 18. Said spoiler parts form between themselves a window 34 for said connecting element 18 and sit with guide profiles on the support element 24.

A connecting device, which comprises the connecting element 18, an adapter 16 and a joining element 14 that is fixedly connected to the wiper arm 12, serves to join the wiper blade 10 to said wiper arm 12 in an articulated manner. The adapter 16 has two side walls 40, which are connected to one another by means of a top wall 42, a front end wall 36 and a rear end wall 62. These walls 36, 40, 42, 62 have a wall thickness of at least two millimeters, while the interior space enclosed by said walls is free of transverse walls so that no direct contact exists between the central web 28 of the connecting element 18 and the adapter 16. The stiffness of said adapter 16 can be modified according to the operating conditions by altering the wall thickness and the outer configuration of said adapter 16.

The front end wall 34 has a connecting profile 38 for the associated spoiler part 32. Said front end wall 36 has a projection 56 facing the top wall 42 and the side walls 40. An end edge 88 of the joining element 14 rests against said side walls in the assembled state. The projection 56 has undercuts 58 on the sides thereof, in which corresponding convex configurations on the end edge 88 of the joining element 14 fit. A short guide rib 54 fits closely to the projection 56 on the edge of said side walls 40 facing the wiper strip 20. In the assembled state, the guide rib 54 grips beneath the associated part of the lower edge of the side wall 80 of the joining element 14. Guide rails 82 attach in the longitudinal direction to the free end sides of the guide ribs 54 in the assembled state. Said guide rails 82 inwardly protrude on the lower edges of the side walls 80 of the joining element 14 and after mounting grip the side walls 40 of the adapter from below.

Figure 2:
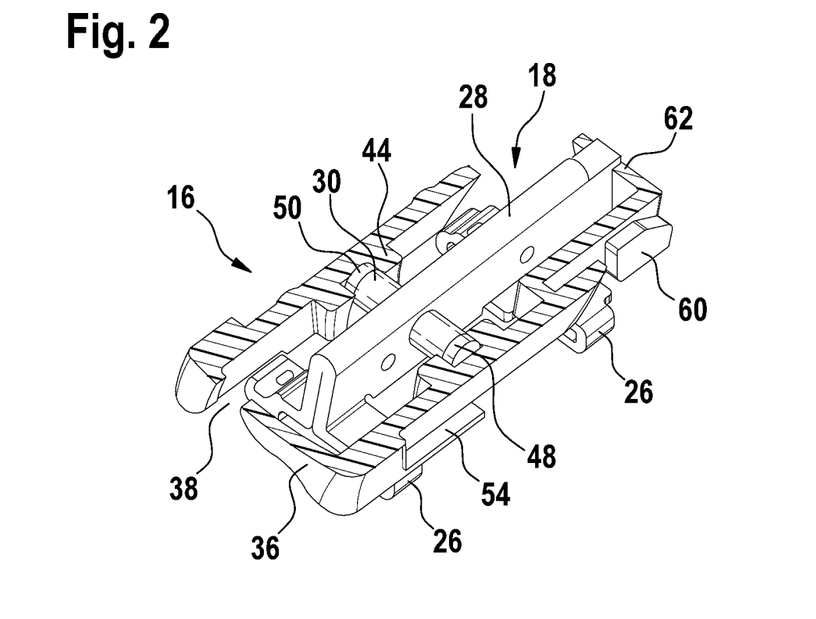
Figure 3:
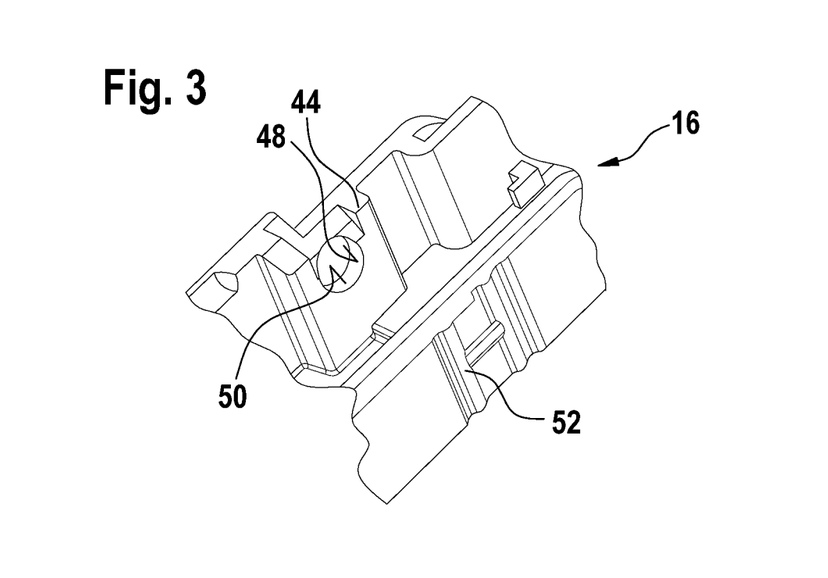
Figure 4:
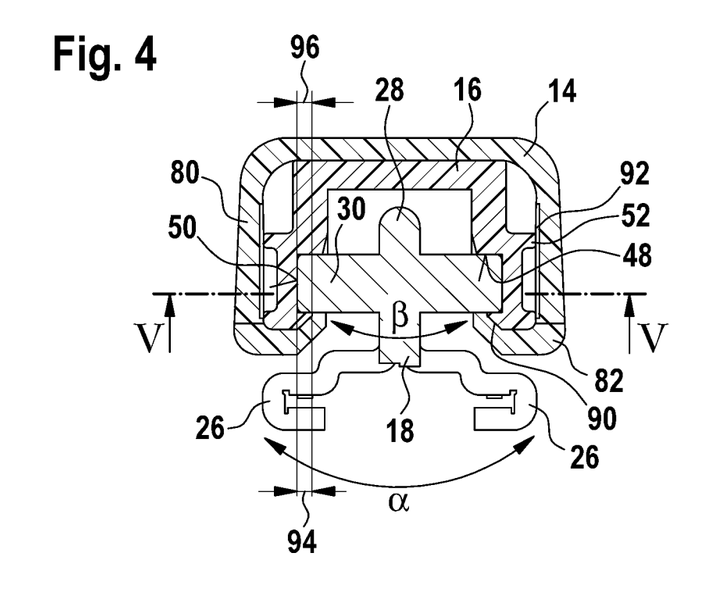
Figure 5:
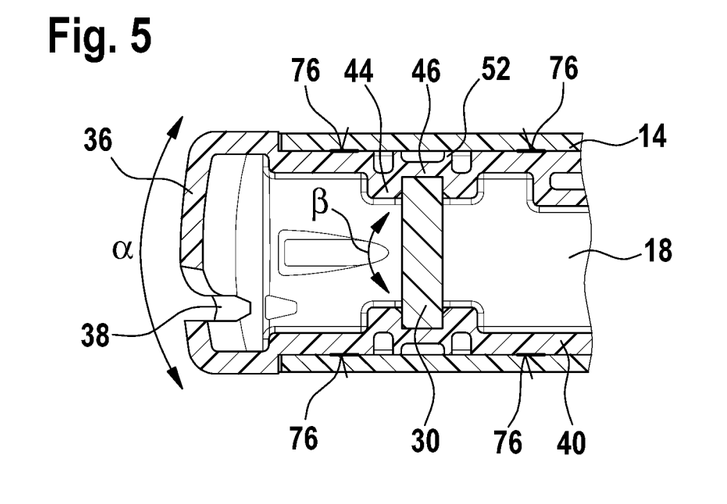
Figure 6:
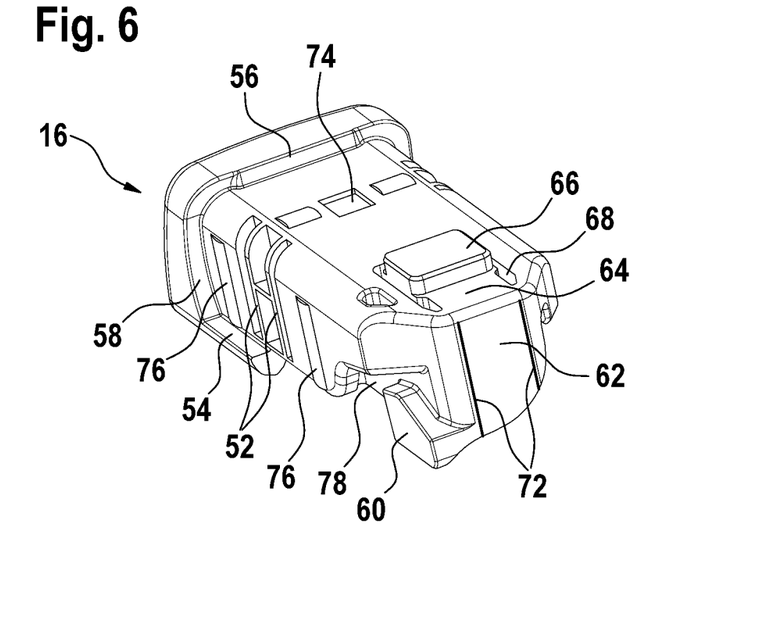
Figure 7:
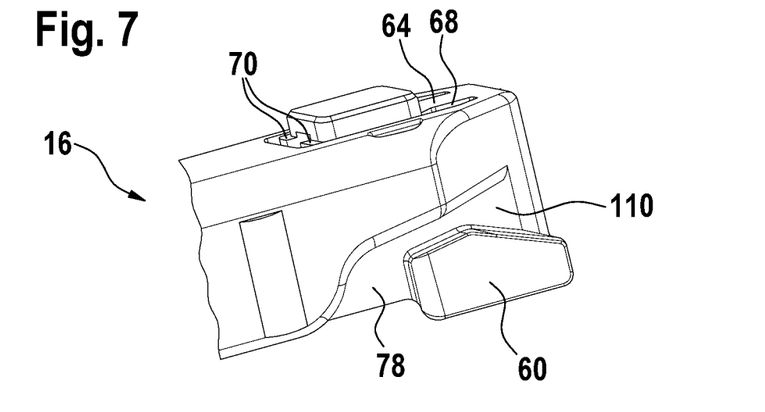

The adapter 16 is pivotably mounted on the hinge shaft 30 by means of hubs 46. The hubs 46 are situated in hub sockets 44 on the inside of the side walls 40. Said hubs have radial sliding surfaces (48, 50), which together with the peripheral surfaces of the hinge shaft 30 form radial bearings, and axial sliding surfaces 50, which together with the end faces of said hinge shaft 30 form axial bearings. The sliding surfaces 48 and 50 are highly polished and have an arithmetic mean roughness Ra<0.2 Φ. A high degree of precision, large fatigue strength and low friction are thereby achieved; thus enabling a precise lateral guidance and torsional stability of the wiper blade 10 and consequently a high level of wiping performance to be ensured.

The hinge shaft 30 is slightly oversized in the length thereof in comparison to the distance of the axial sliding surfaces 50 of the hubs 46 to one another so that a corresponding preload is achieved in the assembled state. Before mounting, a first overlap 94 of, for example, 1 mm results from the oversizing of said hinge shaft and after mounting a second overlap 96 of, for example, 0.8 mm results. The possible angle of torsion ∀ around the longitudinal axis of the wiper blade 10 between the adapter 16 and the connecting element 18 is thereby very small.

Recesses 41 are situated on the outside of the side walls 40 in the region of the hub sockets 44. Stiffening ribs 52 are provided in said recesses, said ribs being designed to be flush with the associated side walls 40. They serve to modify the elastic flexibility of said side walls 40 in the region of the hubs 46. In order that said hubs 46 can give way towards the outside, undercut reliefs 92 are situated on the insides of the side walls 80 of the joining element 14. Contact surfaces 76, whereat the contact between the adapter 16 and the joining element 14 takes place, are provided on the outsides of the side walls 40 in the longitudinal direction on both sides of the recesses 41. By means of the precise support of the adapter 16 in the joining element 14, the lateral relative motion is restricted and the angle of torsion ∃ between these parts is likewise minimized.

The adapter 16 has a spring tongue 64 in the top wall 42 thereof, said spring tongue comprising an outwardly facing pushbutton 66, which protrudes in the assembled state through a corresponding opening in the top wall 84 of the joining element 14 and fits approximately flush with the face of said top wall 84. The spring tongue 64 extends in the longitudinal direction of the wiper blade 10 and is connected to said wiper blade on the side thereof facing the rear end wall 62, while apart from that it is separated from the top wall 42 by a gap 68. In order that said spring tongue 64 including said pushbutton 66 cannot inadvertently leave the opening 86 of the joining element 14, said spring tongue 64 has at least one projection 70 on the side facing away from the rear end wall 62. In the assembled state, said projection rests from the inside against the top wall 84 of the joining element 14. When a load occurs in the dismantling direction, said pushbutton 66 is therefore held on the edge of the opening 86. The compressive forces exerted on the spring tongue 64 are thereby supported on the rear end wall 62, which extends to the lower edge of the sidewalls 40, whereby the connecting cross sections cover a large area and have a high degree of strength. The closed rear end wall further prevents the adapters from getting caught in one another during transport.

In order to mount the wiper blade 10 on the wiper arm 12, the mounted adapter 16 is inserted into the joining element 14 in the longitudinal direction, wherein the guide rails 82 are guided by lateral mounting channels 110. The mounting channels 110, which enlarge towards the rear end wall 62, are formed by lateral recesses 78 in the side walls 40 and by retaining blocks 60, which are disposed in the recesses. The retaining blocks 60 prevent a straight disassembly movement.

Figure 8:
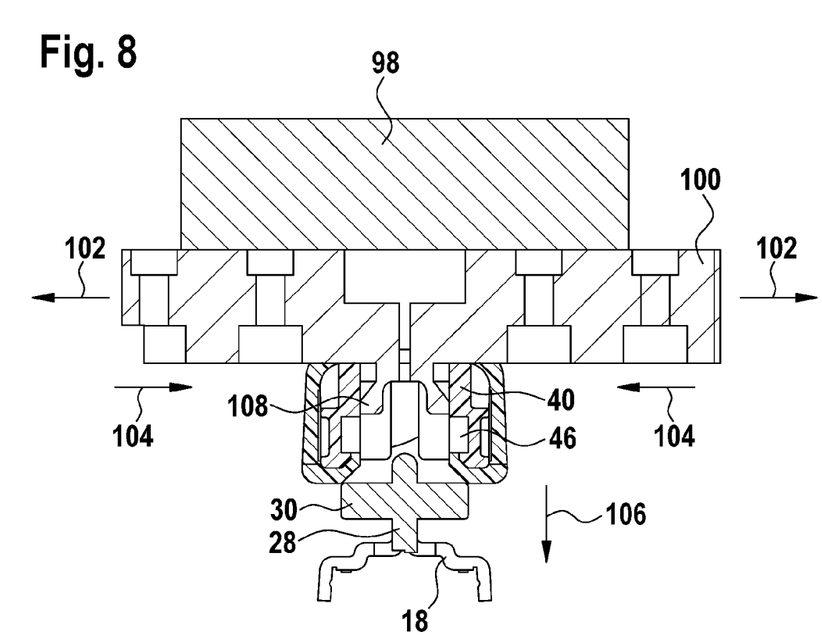

A mounting opening 74 in the top wall 42 of the adapter 16 facilitates the automatic mounting of said adapter 16 on the connecting element 18. A gripper 108 of a mounting tool 100 of a mounting device 98 is inserted through said mounting opening 74 in the mounting direction. Said adapter 16 is tensioned by means of an opening movement of the gripper 108 in the opening direction 102 and is pushed over the hinge shaft 30 of the connecting element 18 by a feed motion in the mounting direction 106. After mounting has been successfully completed, the gripper 108 is moved in the closing direction 104, whereby it is released from said adapter 16, and is removed through the mounting opening 74 in the opposite direction to the mounting direction 106. In order to make mounting easier, the hubs 46 have mounting chamfers on the edges facing the hinge shaft 30.

The invention claimed is:

1. A connecting device which has a connecting element (18) of flat beam design fixed to a wiper blade (10) and an adapter (16) joined to said connecting element in an articulated manner and also a joining element (14) that is joined to a wiper arm (12), the adapter (16) being inserted into a u-shaped cross sectional profile of said joining element and being fixed by means of a spring tongue (64) arranged on a top wall (42) of the adapter to a pushbutton (66), wherein the connecting element (18) has a central web (28) running in a longitudinal direction of the wiper blade (10) and bearing a hinge shaft (30) projecting on long sides of the web, which hinge shaft is mounted in laterally flexible hubs (46) in side walls (40) of the adapter (16), characterized in that outwardly facing walls of said adapter (16), namely the side walls (40), the top wall (42) and end walls (36, 62), have a general wall thickness of at least two millimeters, and the hubs (46) are formed as blind holes, cylindrical surfaces of which form radial sliding surfaces (48) and end faces of which form axial sliding surfaces (50) and close the blind holes, which are highly polished with an arithmetic mean roughness of Ra<0.2μ, and in that the sliding surfaces (48, 50) are the sole contact surfaces between said connecting element (18) and said adapter (16).

2. The connecting device according to claim 1, characterized in that the hubs (46) are disposed in hub sockets (44), which protrude inwardly on insides of the side walls (40).

3. The connecting device according to claim 2, characterized in that recesses (41) are provided in a region of the hub sockets (44) on an outside of the side walls (40), stiffening ribs (52), which fit approximately flush with the outside of the side wall (40) adjacent to the recess (41), being disposed in said recesses.

4. The connecting device according to claim 3, characterized in that the joining element (14) has undercut reliefs (92) on insides of side walls (80) of the joining element in a region of the stiffening ribs (52) of the adapter (16).

5. The connecting device according to claim 3, characterized in that the adapter (16) has contact surfaces (76) on both sides of the recesses (41) on the outsides of the side walls (40), said contact surfaces fitting closely in an assembled state to insides of side walls (80) of the joining element (14).

6. The connecting device according to claim 1, characterized in that a length of the hinge shaft (30) is slightly oversized with respect to a distance that the axial sliding surfaces (50) of the hubs (46) are spaced apart from one another; thus enabling said axial sliding surfaces (50) in an assembled state to rest with a preload against end faces of said hinge shaft (30).

7. The connecting device according to claim 1, characterized in that the spring tongue (64) is connected to a rear end wall (62) and forms a gap (68) with the top wall (42) of the adapter (16), wherein the pushbutton (66) protrudes outwardly over said spring tongue (64) on a side of said spring tongue (64) facing away from said rear end wall (62) and in an assembled state latches into an opening (86) in a top wall (84) of the joining element (14).

8. The connecting device according to claim 7, characterized in that the spring tongue (64) has at least one projection (70) on an end thereof facing away from the rear end wall (62), said projection resting in the assembled state on an inside of the top wall (84) of the joining element (14).

9. The connecting device according to claim 1, characterized in that a rear end wall (62) of the adapter (16) extends from the top wall (42) to a lower edge of the side walls (40) so that large-area cross sections (72) result.

10. The connecting device according to claim 1, characterized in that retaining blocks (60) are provided in recesses (78) on an end of outsides of the side walls (40) which faces a rear end wall (62), said retaining blocks with the recesses (78) forming mounting channels (110) for guide rails (82) on lower edges of side walls (80) of the joining element (14), wherein the mounting channels (110) enlarge towards the rear end wall (62).

11. A method for mounting a connecting device, the connecting device having a connecting element (18) of flat beam design fixed to a wiper blade (10) and an adapter (16) joined to said connecting element in an articulated manner and also a joining element (14) that is joined to a wiper arm (12), the adapter (16) being inserted into a u-shaped cross sectional profile of said joining element and being fixed by means of a spring tongue (64) arranged on a top wall (42) of the adapter to a pushbutton (66), wherein the connecting element (18) has a central web (28) running in a longitudinal direction of the wiper blade (10) and bearing a hinge shaft (30) projecting on long sides of the web, which hinge shaft is mounted in laterally flexible hubs (46) in side walls (40) of the adapter (16), characterized in that outwardly facing walls of said adapter (16), namely the side walls (40), the top wall (42) and end walls (36, 62), have a general wall thickness of at least two millimeters, and the hubs (46) are formed as blind holes, cylindrical surfaces of which form radial sliding surfaces (48) and end faces of which form axial sliding surfaces (50), which are highly polished with an arithmetic mean roughness of Ra<0.2μ, and in that the sliding surfaces (48, 50) are the sole contact surfaces between said connecting element (18) and said adapter (16), wherein the adapter (16) has a mounting opening (74) in the top wall (42) thereof, the method comprising inserting a gripper (108) of a mounting tool (100) of a mounting device (98) into the mounting opening in a mounting direction (106), expanding the gripper in an opening direction (102), and thereafter pushing said adapter (16) held in this manner over the hinge shaft (30) of the connecting element (18), whereupon said hinge shaft (30) interlocks with the hubs (46) of said adapter (16).

* * * * *